United States Patent [19]
LeMay et al.

[11] Patent Number: 4,747,231
[45] Date of Patent: May 31, 1988

[54] LANDSCAPE EDGING

[76] Inventors: Larry R. LeMay; Sharon M. LeMay, both of Rte. 2 Box 176A, Holcombe, Wis. 54745

[21] Appl. No.: 897,926

[22] Filed: Aug. 19, 1986

[51] Int. Cl.⁴ .............................................. A01G 1/00
[52] U.S. Cl. ........................................................ 47/33
[58] Field of Search ....................... 52/586; 47/32, 33; 404/6, 7, 8; 256/19, 29, 24

[56] References Cited

U.S. PATENT DOCUMENTS

| | | | |
|---|---|---|---|
| 2,550,883 | 5/1951 | St. Vincent | 52/586 |
| 3,484,989 | 12/1969 | Lanzinsky | 47/33 |
| 3,788,001 | 1/1974 | Balfanz, Jr. | 47/33 |
| 4,543,745 | 10/1985 | Beck | 47/33 |
| 4,566,219 | 1/1986 | Firth | 47/33 |

FOREIGN PATENT DOCUMENTS 15425 of 1886 United Kingdom .................... 47/33

Primary Examiner—Robert A. Hafer
Assistant Examiner—Bradley M. Lewis
Attorney, Agent, or Firm—Berman, Aisenberg & Platt

[57] ABSTRACT

A landscape edging has a plurality of sections engaged adjacent to each other on a length of strip material, each length of strip material having two longitudinal edges, one of the longitudinal edges preferably having a cylindrical-shaped bead-like projection. The strip engages in a similarly shaped slot cut through one end of each section, forming a length of landscape edging. The sections are preferably log sections.

9 Claims, 1 Drawing Sheet

U.S. Patent | May 31, 1988 | 4,747,231
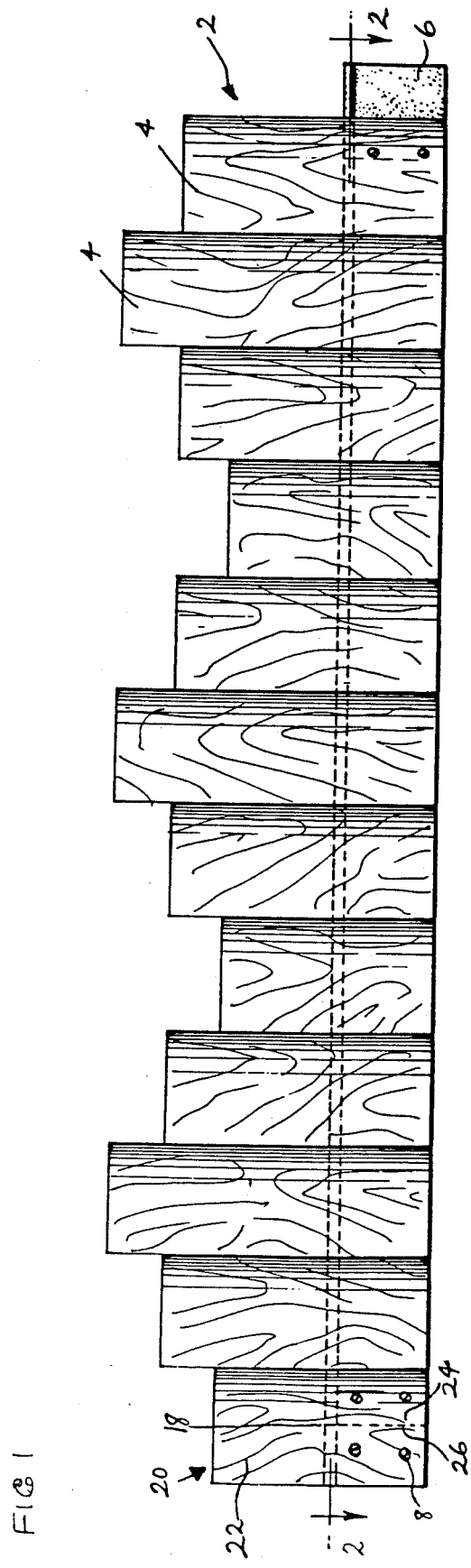
FIG 1
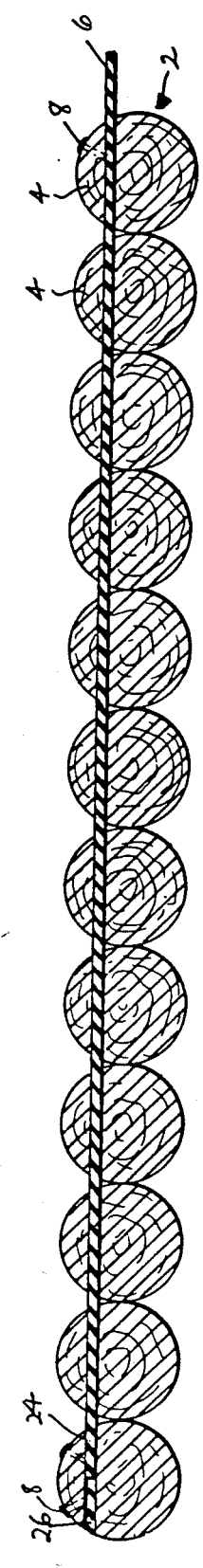
FIG 2
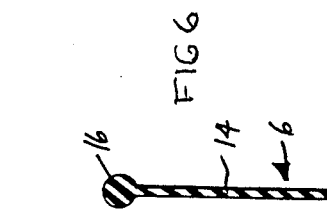
FIG 6
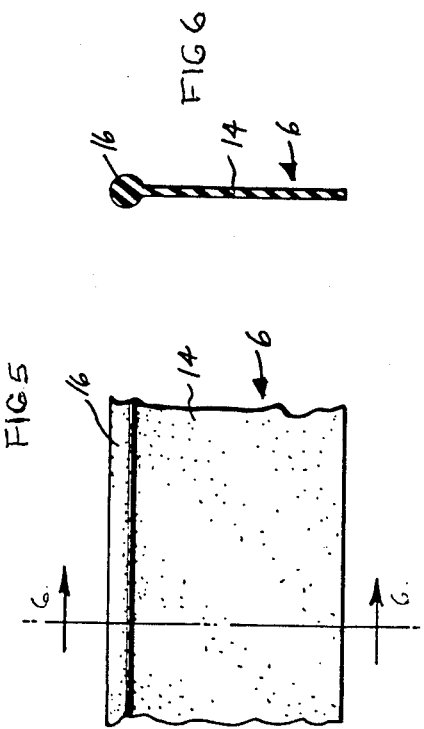
FIG 5
FIG 4
FIG 3

LANDSCAPE EDGING

FIELD OF THE INVENTION

This invention relates to edging for garden beds or lawns.

BACKGROUND OF THE INVENTION

Existing lawn and garden edging is not sufficiently strong to satisfy many users. One form of conventional edging uses sections of logs attached together at the back by one or more strands of wire. Such edging does not serve as an impenetrable barrier to weeds and grass as they may grow through the spaces between the timbers. Additionally, with time, the timbers are gradually displaced with respect to each other if subjected to any pressure. Furthermore, the wire attachments may rust and break, thus negating the efficiency of the edging.

Other conventional edging is comprised of plastic strips which are partly buried in the ground, and are partly visible above the ground. While these strips are impenetrable to weeds and grass, they are unsightly and not decorative. Such strips are generally only used where a decorative edging is not needed.

Other prior art edgings include those of Beck, U.S. Pat. No. 4,543,745, in which a vertical row of timers which have been sawn off to provide a flat edging at the back are secured to a metal sheet. The metal sheet is likely to rust, and thus, the edging will deteriorate. In the patent to Dombrowski, U.S. Pat. No. 2,619,686, timbers for use in building construction are assembled together in parallel relationship by means of a thin strips of metal which fit into slots in the vertical edge of each log. The strip has no integrity on its own, but is used as part of a structure for building log cabins. Freedman, U.S. Pat. No. 2,746,723 shows a fence in which the boards are held together by supporting rails behind pickets. Kannen, U.S. Pat. No. 1,853,055, describes a stone wall, made in sections connected by ropes. Novak, U.S. Pat. No. Des. 276,494 shows a plastic landscape edging unit which is assembled by circumferential joining of the plastic sections.

SUMMARY OF THE INVENTION

An edging for garden beds or lawns has a plurality of log sections placed adjacent to each other, connected by a plastic or rubber strip. Each log has a slot cut through its base, enabling a rubber or plastic strip, of similar shape to the slot, to be inserted sequentially through a plurality of adjacent slotted logs. The ends of the strip are secured by screws through the log section housing the strip end. The strip preferably has a cylindrical-shaped bead along its top edge, and engages in a similarly shaped slot within each log section.

It is an object of the invention to provide a sturdy landscape edging which is long-lasting and aesthetically pleasing.

BRIEF DESCRIPTION OF THE FIGURES

FIG. 1 shows an elevational view of a landscape edging of the invention.

FIG. 2 shows a bottom view of the landscape edging of FIG. 1.

FIG. 3 shows a perspective view of a single log used in the edging.

FIG. 4 shows a bottom view of a log used in the edging.

FIG. 5 shows an elevational view of a strip used to secure the logs together.

FIG. 6 shows a cross-section taken on line 6—6 of FIG. 5.

DETAILED DESCRIPTION OF THE INVENTION

The invention is a landscape edging having a plurality of vertically-placed sections, preferably log sections, which are generally situated adjacent to each other on a length of strip material, each length of strip material having two longitudinal edges, one of the longitudinal edges preferably having a bead-like projection along its length, the bead-like projection being on the upper edge of the strip when the strip is placed in a position to engage each section. The strip engages in a slot of similar shape to the strip, the slot being cut through one end of each log section. The log sections are threaded onto the strip to form a length of landscape edging having the appearance of many log sections standing adjacent to each other. The strip material, which may be flexible, and which is preferably made of plastic, allows the landscape edging to take an appropriate shape, including straight lengths, circles and bends. These sections can be shortened, or connected together, very rapidly. A preferred means of securing the strip to the end log is by screws through the log and the strip, but any appropriate method may be used.

The internal slot cut through the end of each section gives the edging unexpectedly advantageous strength and, additionally, the edging is aesthetically pleasing when viewed from either the front or back.

Referring now to FIGS. 1 to 6, in which like numerals represent like parts, FIG. 1 shows a landscape edging 2 of the invention, having a plurality of log sections 4 standing adjacent to each other. Flexible strip 6, having a flat portion 14 and a cylindrical portion 16 running along one edge thereof, is engaged in slot 10 in each log. Each slot 10 is keyhole-shaped, as shown in FIG. 3, to engage strip 14. Thus, the log sections cannot be lifted off the strip, but may only be added and removed by a sliding or threading operation. The slot may be cut through the base of the log either on a diameter or approximately one-quarter of the way across the log, as shown in FIGS. 2 and 4, or in any other appropriate position.

Each end of the flexible strip is secured to the log section which engages over the end of the strip, by any suitable means, such as by screws 8. The joint 18 between two sections of landscape edging is not visible to an onlooker except by the location of the screws, which are very unobtrusive. One log section 22 is placed over the adjacent ends 24 and 26 of two adjacent flexible strips and the adjacent ends of the flexible strips are secured to the inside of that log section by screws, or other appropriate fastenings.

The strip, which is preferably of flexible plastic, is impervious to the elements, and will not rust or corrode. If the strip is flexible, the edging may be bent to follow the contours of a lawn, garden bed, or other landscape feature, sufficient flexibility being provided to curve the landscape edging of the invention into a circle or around right-angled bends. The logs may be used either with or without the bark, and may be pressure treated or otherwise treated to ensure their longevity. Natural logs are preferably used, but manufactured slotted sections may alternatively be used.

The invention provides a particularly advantageous landscape edging which is inherently strong since the log sections cannot be lifted off the flexible strip due to the bead-like projection along the top of the strip. The bead-like projections, illustrated in FIGS. 5 and 6 as cylindrical in shape, may have any other appropriate shape that engages in a suitably shaped slot in the log sections.

If the bead edge on the strip is omitted, the log sections may be lifted on and off the strip, and may be secured to the strip, if required, by screws, adhesively, or by other suitable means. Even if the bead edge is present, sections other than the end sections may be secured to the strip, for added strength.

The landscape edging of the invention is appropriately sized. As a non-limiting example, in the log edging shown in FIG. 1, the strip may be 4 inches high, with a thickness of 1/16 inch, and a bead of 7/16 inch diameter. The log sections, shown of three different heights, may suitably be 8, 10 and 12 inches high and 4 inches in diameter. The slot through the log sections for engaging the strip, may be ¼ inch wide with a cylindrical bead-shaped end ½ inch in diameter. Screws, each 1 inch long, may be placed adjacent to the slot to secure the end of the strip to the log section, the slot being placed approximately one-quarter of the way through a 4 inch diameter log section, as shown in FIG. 2. A section of landscape edging may be 4 feet, or other appropriate length. If 3 inches of flexible strip is left exposed at one end of the assembled landscape edging for insertion into the end log of the next section, the 3 inch exposed length may be trimmed appropriately to the size of end on the next section, or cut off completely if an adjacent section of landscape edging is not needed.

While the invention has been described above with respect to certain embodiments thereof, it will be appreciated that various changes and modifications may be made with departing from the spirit and scope of the invention.

What is claimed is:

1. A landscape edging comprising a plurality of vertically-placed log sections removably engaged adjacent to each other on a length of flexible non-corrodable strip material, each length of strip material having two longitudinal edges and a bead-shaped projection along the length of said strip engaging in a bead-shaped portion of a slot cut vertically through one end of each log section, whereby a required length of landscape edging is formed by securing end log sections to said length of flexible strip material.

2. A landscape edging of claim 1 wherein the strip material is made of plastic.

3. A landscape edging of claim 1 wherein the slot cut into one end of each section is cut approximately diametrically across the end of the section.

4. A landscape edging of claim 1 wherein the slot cut into one end of each section is cut approximately one-quarter of the distance across the end of the log section.

5. A landscape edging of claim 1 wherein the strip is secured by at least two sections which engage over the strip.

6. A landscape edging of claim 5 wherein the two sections are the sections located at each end of the strip.

7. A landscape edging of claim 1 wherein one of the longitudinal edges of the strip comprises a shaped projection, and wherein said strip engages a similarly shaped slot through the end of the log.

8. A landscape edging of claim 7 wherein the strip has a cylindrical shaped bead-like projection along one longitudinal edge and said strip engages in a keyhole-shaped slot cut into one end of each section.

9. A landscape edging comprising a plurality of vertically-paced log sections removably engaged adjacent to each other on a length of flexible non-corrodable strip material, each length of strip material comprising a cylindrical shaped bead-like projection along its upper longitudinal edge, said strip engaging in a keyhole-shaped slot cut through one end of each log section.

* * * * *